United States Patent
King et al.

(10) Patent No.: US 11,995,469 B2
(45) Date of Patent: May 28, 2024

(54) METHOD AND SYSTEM FOR PREEMPTIVE CACHING ACROSS CONTENT DELIVERY NETWORKS

(71) Applicant: EMC IP Holding Company LLC, Hopkinton, MA (US)

(72) Inventors: James Robert King, Norwood, MA (US); Robert Anthony Lincourt, Jr., Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 565 days.

(21) Appl. No.: 16/727,047

(22) Filed: Dec. 26, 2019

(65) Prior Publication Data
US 2021/0200591 A1    Jul. 1, 2021

(51) Int. Cl.
*G06F 9/50*     (2006.01)
*G06F 9/30*     (2018.01)
*G06F 21/31*    (2013.01)
*H04L 9/08*     (2006.01)
*H04L 9/32*     (2006.01)

(52) U.S. Cl.
CPC ........ *G06F 9/5011* (2013.01); *G06F 9/30047* (2013.01); *G06F 21/31* (2013.01); *H04L 9/0872* (2013.01); *H04L 9/3297* (2013.01)

(58) Field of Classification Search
CPC .... G06F 9/5011; G06F 9/30047; G06F 21/31; H04L 9/0872; H04L 9/3297
See application file for complete search history.

(56) References Cited

U.S. PATENT DOCUMENTS

| | | | |
|---|---|---|---|
| 6,553,461 B1* | 4/2003 | Gupta | G06F 16/9574 711/213 |
| 9,710,481 B1* | 7/2017 | Darling, Jr. | G06F 12/121 |
| 10,049,170 B1* | 8/2018 | Long | G06F 16/986 |

(Continued)

OTHER PUBLICATIONS

Lee, Jung-Hwa, and Jung-Min Park. "User-centric real time service scheduling for robots" 2011 IEEE International Conference on Robotics and Biomimetics. IEEE, 1024-1028 (Year: 2011).*

*Primary Examiner* — Meng Ai T An
*Assistant Examiner* — Willy W Huaracha
(74) *Attorney, Agent, or Firm* — Chamberlain, Hrdlicka, White, Williams & Aughtry; Aly Z. Dossa

(57) ABSTRACT

A method and system for preemptive caching across content delivery networks. Specifically, the disclosed method and system entail proactively seeding (or deploying) resources to edge nodes of a content delivery network based on prospective information sources such as, for example, travel itineraries, map route plans, calendar appointments, etc. Resource delivery deadlines and destinations may be derived from these prospective information sources in order to preemptively direct and cache resources near these resource delivery destinations (i.e., geo-locations) prior to or by the expected times (i.e., future point-in-times) during which a resource requestor and/or consumer is anticipated to be positioned at or within proximity to the resource delivery destinations. Through proactive seeding of resources, which may reflect content or service functionalities, reduced latency may be observed at least with respect to requesting the resources from the content delivery network.

12 Claims, 13 Drawing Sheets

(56) References Cited

U.S. PATENT DOCUMENTS

| | | | | |
|---|---|---|---|---|
| 2002/0161802 | A1* | 10/2002 | Gabrick | G06F 40/103 |
| | | | | 715/236 |
| 2009/0003828 | A1* | 1/2009 | So | H04L 61/103 |
| | | | | 398/56 |
| 2011/0022298 | A1* | 1/2011 | Kronberg | G01C 21/3484 |
| | | | | 701/532 |
| 2011/0131341 | A1* | 6/2011 | Yoo | G06F 16/9574 |
| | | | | 709/230 |
| 2013/0132372 | A1* | 5/2013 | Gilbert | G06F 16/25 |
| | | | | 707/769 |
| 2014/0364056 | A1* | 12/2014 | Belk | H04B 5/0031 |
| | | | | 455/41.1 |
| 2015/0089035 | A1* | 3/2015 | Yussouff | H04L 67/288 |
| | | | | 709/223 |
| 2016/0006645 | A1* | 1/2016 | Rave | H04L 67/5681 |
| | | | | 709/203 |
| 2016/0103912 | A1* | 4/2016 | Daggett | G16H 50/70 |
| | | | | 707/736 |
| 2016/0182582 | A1* | 6/2016 | Wagenaar | H04L 65/65 |
| | | | | 709/231 |
| 2017/0094009 | A1* | 3/2017 | Wistow | H04L 61/4511 |
| 2017/0134276 | A1* | 5/2017 | White | G06F 12/0862 |
| 2017/0366498 | A1* | 12/2017 | Green | H04N 21/4784 |
| 2018/0064936 | A1* | 3/2018 | Shazly | A61N 1/327 |

* cited by examiner

METHOD AND SYSTEM FOR PREEMPTIVE CACHING ACROSS CONTENT DELIVERY NETWORKS

BACKGROUND

Current content delivery network implementations rely on localized caches of geo-distributed resources. These current implementations, however, are reactive with respect to processing resource requests rather than proactive.

SUMMARY

In general, in one aspect, the invention relates to a method for preemptively caching resources. The method includes receiving, from a first edge node, a first preemptive caching request including a first resource retrieval object, a first resource delivery deadline, and a first resource delivery destination, performing a first lookup on a resource catalog using at least a portion of the first resource retrieval object to identify a first resource, performing a second lookup on an edge catalog using the first resource delivery destination to identify a second edge node, and deploying, to preemptively cache, the first resource onto the second edge node prior to the first resource delivery deadline.

In general, in one aspect, the invention relates to a non-transitory computer readable medium (CRM). The non-transitory CRM includes computer readable program code, which when executed by a computer processor, enables the computer processor to receive, from a first edge node, a first preemptive caching request including a first resource retrieval object, a first resource delivery deadline, and a first resource delivery destination, perform a first lookup on a resource catalog using at least a portion of the first resource retrieval object to identify a first resource, perform a second lookup on an edge catalog using the first resource delivery destination to identify a second edge node, and deploy, to preemptively cache, the first resource onto the second edge node prior to the first resource delivery deadline.

Other aspects of the invention will be apparent from the following description and the appended claims.

DETAILED DESCRIPTION

Figure 1A:
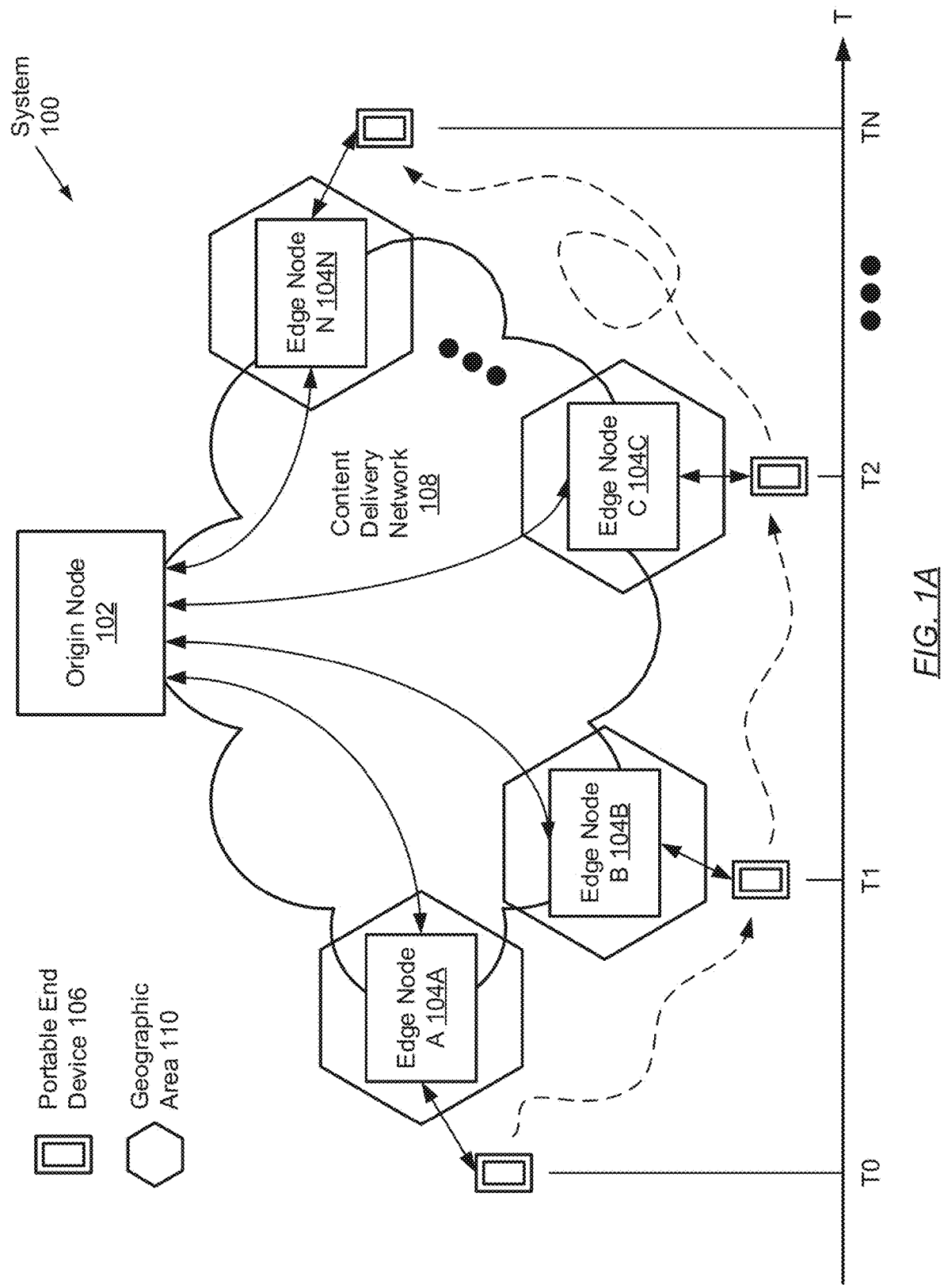
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for preemptive caching across content delivery networks. Specifically, one or more embodiments of the invention entails proactively seeding (or deploying) resources to edge nodes of a content delivery network based on prospective information sources such as, for example, travel itineraries, map route plans, calendar appointments, etc. Resource delivery deadlines and destinations may be derived from these prospective information sources in order to preemptively direct and cache resources near these resource delivery destinations (i.e., geo-locations) prior to or by the expected times (i.e., future point-in-times) during which a resource requestor and/or consumer is anticipated to be positioned at or within proximity to the resource delivery destinations. Through proactive seeding of resources, which may reflect content or service functionalities, reduced latency may be observed at least with respect to requesting the resources from the content delivery network.

FIG. 1A shows a system in accordance with one or more embodiments of the invention. The system (100) may include an origin node (102) operatively connected to multiple edge nodes (104A-104N) through a content delivery network (108). Further, the system (100) may include a portable end device (106) expected to operatively connect to the edge nodes (104A-104N), respectively, during varying points-in-time. Each of these system (100) components is described below.

In one embodiment of the invention, the origin node (102) may represent enterprise datacenter and/or cloud computing backend infrastructure, whereon resources (e.g., content, service functionality, user ecosystem, etc.) respective to one or more services (described below) may be consolidated. The origin node (102) may further represent the backbone or core of the content delivery network (108). Furthermore, the origin node (102) may include functionality to: receive and process resource requests, originating from any service client of the aforementioned service(s), for these consolidated resources; and receive and process preemptive caching requests from any edge node (104A-104N). With respect to the latter, the origin node (102) may perform the various steps outlined in the flowcharts of FIGS. 3A and 3B. One of ordinary skill will appreciate that the origin node (102) may perform other functionalities without departing from the scope of the invention. Examples of the origin node (102) may include, but are not limited to, one or more physical or virtual servers, one or more mainframes, one or more workstations, one or more computing systems similar to the exemplary computing system shown in FIG. 4, or any combination thereof. Moreover, the origin node (102) is described in further detail below with respect to FIG. 1D.

In one embodiment of the invention, an edge node (104A-104N) may represent a physical compute and/or storage host that may reside at the "edge" (i.e., infrastructure boundary or logical extreme) of the content delivery network (108). An edge node (104A-104N) may serve as a cache point for one or more resources, thereby facilitating the placement of the resource(s) as proximal as possible to any data sources and/or resource requestors (e.g., portable end device (106)). To that extent, the various edge nodes (104A-104N) may reside, respectively, across various geo-locations in order to maximize coverage while minimizing resource retrieval latency. Accordingly, each edge node (104A-104N) may be associated with, and thus responsible for, a given geographic area (110), which may or may not overlap with other geographic areas serviced by other edge nodes (104A-104N).

In one embodiment of the invention, an edge node (104A-104N) may also represent a bridge or interconnection point between two or more different communication networks (i.e., a wireless mobile network and the content delivery network (108)). That is, an edge node (104A-104N) may communicate with the portable end device (106), and vice versa, through a geographically local 5G mobile network. A 5G mobile network (not shown) may represent a communication network that employs a next-generation standard for wireless communications. Further, a 5G mobile network may deliver increased capacity (i.e., bandwidth), lower latency, and faster transmission speeds over the existing wireless communication standards (e.g., 2G, 3G, and 4G).

Furthermore, in one embodiment of the invention, an edge node (104A-104N) may include functionality to: receive and process resource requests; delegate resource requests to the origin node (102) should it be determined that a resource, sought by a resource request, is not cached or available locally; receive one or more resources from the origin node (102) for local caching (or storing) and/or implementing (or executing); and generating and forwarding preemptive caching requests to the origin node (102). Substantively, an edge node (104A-104N) may at least perform the various steps outlined in the flowcharts of FIGS. 2A-2C. One of ordinary skill will appreciate that an edge node (104A-104N) may perform other functionalities without departing from the scope of the invention. Examples of an edge node (104A-104N) may include, but are not limited to, a cellular site (also referred to as a cellular tower or base station), an Internet-of-Things (IOT) device, and a network device (e.g., switch, router, gateway, multilayer switch, access point, etc.). Moreover, an edge node (104A-104N) is described in further detail below with respect to FIG. 1C.

In one embodiment of the invention, the portable end device (106) may represent any physical device capable of receiving, generating, processing, storing, and/or transmitting data, which may also be designed to be easily carried or moved. The portable end device (106) may be operated by a user or multiple users (not shown). Further, the portable end device (106) may include functionality to: issue resource requests, for one or more resources, to an edge node (104A-104N) and/or the origin node (102); and, accordingly, receive sought resources from an edge node (104A-104N) and/or the origin node (102). One of ordinary skill will appreciate that the portable end device (106) may perform other functionalities without departing from the scope of the invention. Examples of the portable end device (106) may include, but are not limited to, a smartphone, a laptop computer, a tablet computer, a handheld gaming console, a handheld media (i.e., video and/or audio) player, a wearable electronic device, and any computing system similar to the exemplary computing system shown in FIG. 4. Moreover, the portable end device (106) is described in further detail below with respect to FIG. 1B.

In one embodiment of the invention, the content delivery network (108) may represent a geo-distributed (i.e., geographically distributed) communication network, which may be designed and implemented to make various resources available as close as possible to any given resource requestor and/or consumer (e.g., service client (described below) (see e.g., FIG. 1B)) supported by the origin node (102). The content delivery network (108) may form from a collection of different communication networks (e.g., one or more local area networks (LANs), one or more wide area networks (WANs) such as the Internet, one or more mobile or cellular networks, or any combination thereof). Further, the content delivery network (108) may be implemented using any combination of wired and/or wireless connections, and may encompass various interconnected subcomponents (aside from the origin node (102) and the edge nodes (104A-104N)) (e.g., switches, routers, gateways, etc.) that may facilitate communications between the above-mentioned system (100) components. Moreover, the content delivery network (108) may enable the above-mentioned system (100) components to communicate with one another using any combination of wired and/or wireless communication protocols.

While FIG. 1A shows a configuration of components, other system (100) configurations may be used without departing from the scope of the invention. For example, the system (100) may further include one or more additional origin nodes (not shown), which may further implement the backbone or core of the content delivery network (108). By way of another example, the system (100) may further consider one or more additional portable end devices (not shown), which similarly to the portable end device (106), may operatively connect to the various edge nodes (104A-104N) (as well as each other) during varying points-in-time based on the proximity of their respective geo-locations to the edge node (104A-104N) geographic coverage (110).

Figure 1B:
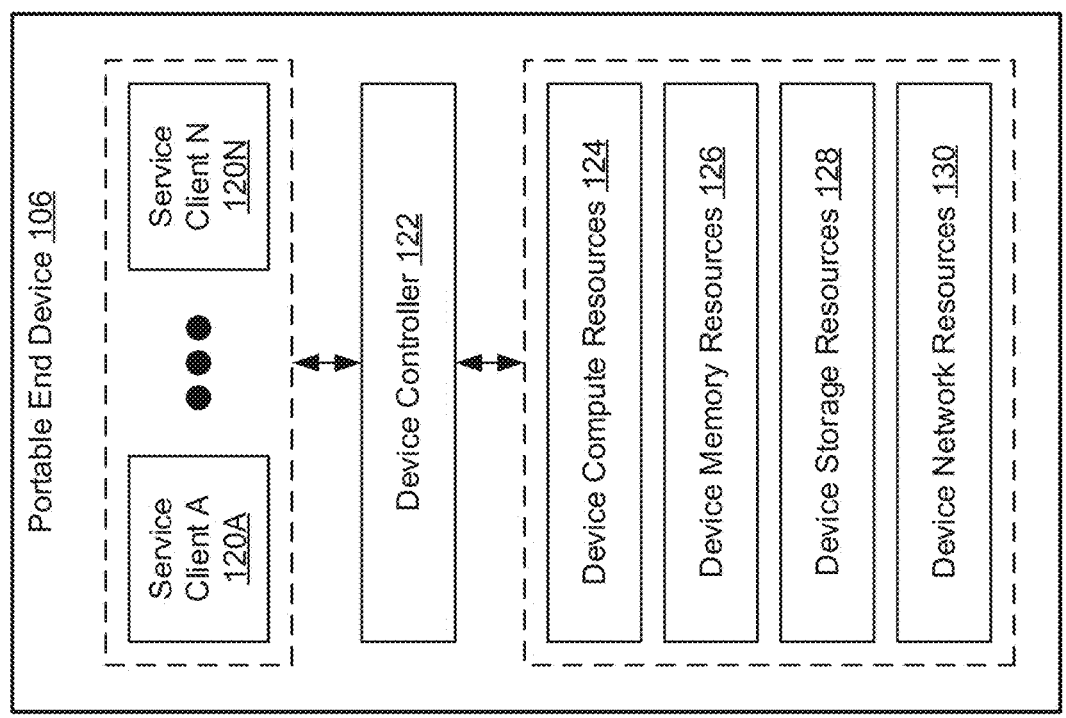
FIG. 1B shows a portable end device in accordance with one or more embodiments of the invention.

FIG. 1B shows a portable end device in accordance with one or more embodiments of the invention. The portable end device (106) may include one or more service clients (120A-120N), a device controller (122), and a variety of device resources in the form of: device compute resources (124), device memory resources (126), device storage resources (128), and device network resources (130). Each of these portable end device (106) subcomponents is described below.

In one embodiment of the invention, a service client (120A-120N) may refer to a computer program or process that may execute on the underlying hardware of the portable end device (106). A service client (120A-120N) may represent any granularity of a frontend application, utility, background process, or other software, which may be responsible for performing one or more functions, tasks, operations, etc., on the portable end device (106). The term "any granularity", at least with respect to a computer program or process, may refer to any discrete chunk of computer readable program code (e.g., an expression, a statement or definition including multiple expressions, a function including multiple statements or definitions, a class including multiple functions, a module including multiple classes, or the program or process in entirety including multiple modules). Furthermore, the aforementioned functions, tasks, operations, etc., may or may not be instantiated by the user(s) of the portable end device (106). To carry out at least a portion of these activities, a service client (120A-120N) may include functionality to: request and consume any combination of the device resources by way of service calls to the device controller (122); and request and receive resources (e.g., content, user ecosystems, off-site service functionality, etc.) from their respective service counterparts executing on an edge node or an origin node (see e.g., FIG. 1A). One of ordinary skill will appreciate that a service client (120A-120N) may perform other functionalities without departing from the scope of the invention. Examples of a service client (120A-120N) may include, but are not limited to, an email client, a database client, a web browser, a streaming media player, a computer game, a workload scheduler, an anti-virus screener, a simulator, a social media application, a real-time online communication client, a word processor, a content editor, etc.

In one embodiment of the invention, the device controller (122) (also referred to as the device operating system) may refer to a computer program that may execute on the underlying hardware of the portable end device (106). The device controller (122) may be responsible for overseeing portable end device (106) operations. To that extent, the device controller (122) may include functionality to: support fundamental portable end device (106) functions; schedule tasks; mediate interactivity between logical (e.g., software) and physical (e.g., hardware) portable end device (106) components; allocate or provision device resources; and execute or invoke other computer programs (or processes) executing on the portable end device (106) (e.g., utilities, background processes, etc.). One of ordinary skill will appreciate that the device controller (122) may perform other functionalities without departing from the scope of the invention.

In one embodiment of the invention, a device compute resource (124) may refer to a measurable quantity of a compute-relevant resource type that can be requested, allocated, and consumed. In turn, a compute-relevant resource type may pertain to a physical device (i.e., hardware), a logical intelligence (i.e., firmware, software, or virtualization), or a combination thereof, which may provide computing availability and/or functionality on the portable end device (106). Examples of a device compute resource (124) may include, but are not limited to, a central processing unit (CPU), a graphics processing unit (GPU), a microcontroller, a virtual CPU, a single-board computer, a field-programmable gate array (FPGA), an artificial intelligence (AI) process, a virtual cluster, etc.

In one embodiment of the invention, a device memory resource (126) may refer to a measurable quantity of a memory-relevant resource type that can be requested, allocated, and consumed. In turn, a memory-relevant resource type may pertain to a physical device (i.e., hardware), a logical intelligence (i.e., firmware, software, or virtualization), or a combination thereof, which may provide memory availability and/or functionality on the portable end device (106). Examples of a device memory resource (126) may include, but are not limited to, volatile physical memory (e.g., static random access memory (SRAM), dynamic random access memory (DRAM), etc.), non-volatile physical memory (e.g., read-only memory (ROM), flash memory, etc.), and virtual memory pools formed from any combination thereof.

In one embodiment of the invention, a device storage resource (128) may refer to a measurable quantity of a storage-relevant resource type that can be requested, allocated, and consumed. In turn, a storage-relevant resource type may pertain to a physical device (i.e., hardware), a logical intelligence (i.e., firmware, software, or virtualization), or a combination thereof, which may provide data storage availability and/or functionality on the portable end device (106). Examples of a device storage resource (128) may include, but are not limited to, a hard disk drive (HDD), a solid state drive (SSD), and virtual storage pools formed from any combination thereof.

In one embodiment of the invention, a device network resource (130) may refer to a measurable quantity of a network-relevant resource type that can be requested, allocated, and consumed. In turn, a network-relevant resource type may pertain to a physical device (i.e., hardware), a logical intelligence (i.e., firmware, software, or virtualization), or a combination thereof, which may provide networking availability and/or functionality on the portable end device (106). Examples of a device network resource (130) may include, but are not limited to, a network interface card (NIC), a network adapter, a cellular network antenna, any other communications and/or data exchange-enabling device, or a virtual equivalent of any combination thereof.

While FIG. 1B shows a configuration of subcomponents, other portable end device (106) configurations may be used without departing from the scope of the invention.

Figure 1C:
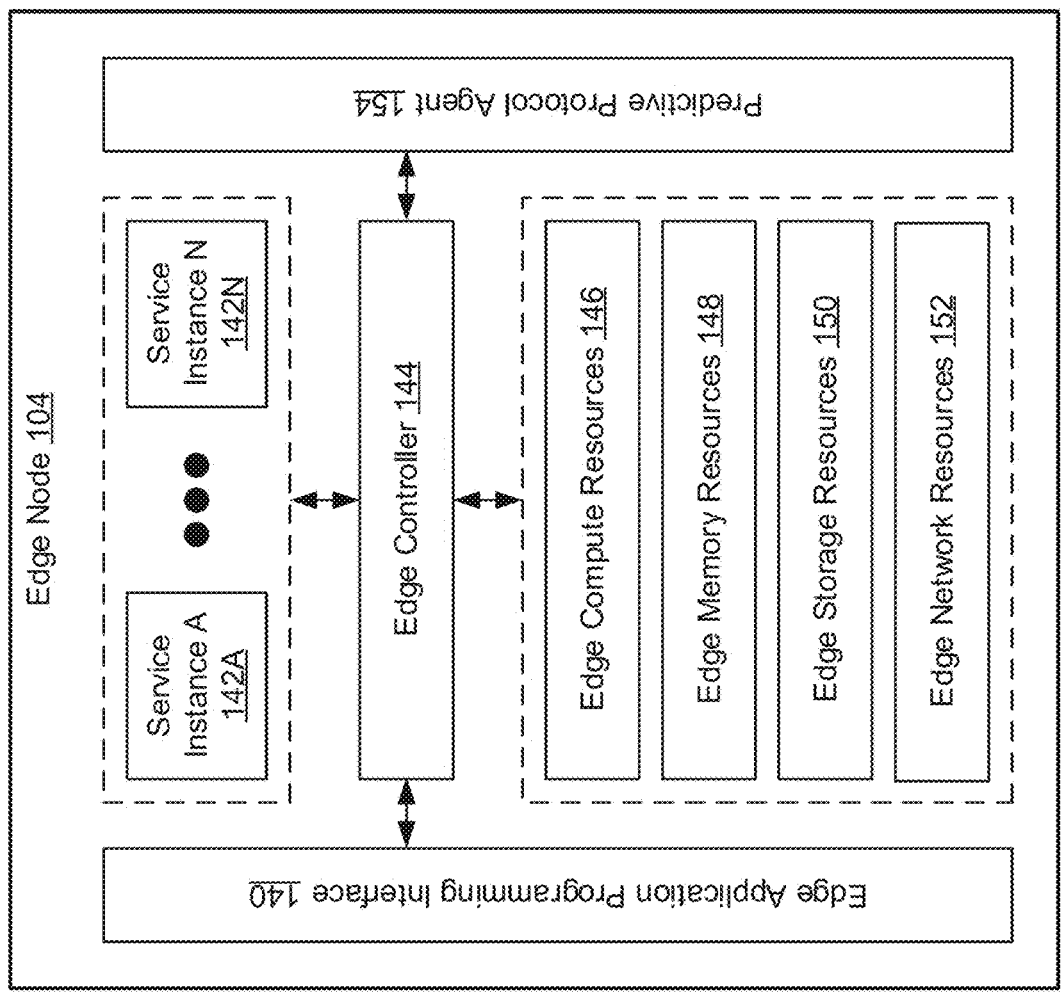
FIG. 1C shows an edge node in accordance with one or more embodiments of the invention.

FIG. 1C shows an edge node in accordance with one or more embodiments of the invention. The edge node (104) may include an edge application programming interface (API) (140), one or more service instances (142A-142N), an edge controller (144), a predictive protocol agent (154), and a variety of edge resources in the form of: edge compute resources (146), edge memory resources (148), edge storage resources (150), and edge network resources (152).

In one embodiment of the invention, the edge API (140) may refer to a logical interface or interactivity protocol, which may facilitate communications between the edge node (104) and one or more external entities (e.g., a service client executing on the portable end device (see e.g., FIG. 1B), a service hosted on an origin node (see e.g., FIG. 1D), etc.). To that extent, the edge API (140) may include functionality to: receive resource requests issued from one or more service clients; delegate received resource requests to one or more service instances (142A-142N) or services (on the origin node) for processing; receive resources previously unavailable on the edge node (104) from the origin node; and cache received resources by storing resources (i.e., content, user ecosystems, etc.) locally or updating the service instance(s) (142A-142N) using the resources (i.e., service functionalities, etc.). One of ordinary skill will appreciate that the edge API (140) may perform other functionalities without departing from the scope of the invention.

In one embodiment of the invention, a service instance (142A-142N) may refer to a computer program or process that may execute on the underlying hardware of the edge node (104). A service instance (142A-142N) may represent a limited version of a corresponding service (not shown), which may invoke a portion of the various functions (or service functionalities) offered by the corresponding service. To that extent, a service instance (142A-1242N) may include functionality to process resource requests from a corresponding service client on the portable end device (see e.g., FIG. 1B) by: returning content, sought in the resource requests and to the requesting service client on the portable end device, should the content be locally cached on the edge node (104); invoking a service functionality using one or more parameters enclosed in the resource requests to obtain a service functionality result, should the resource requests be directed to a data processing operation versus a data retrieval operation; and forward, through the edge API (140), resource requests to a corresponding service on the origin node (see e.g., FIG. 1D) should the resource (i.e., content, service functionality, etc.) sought in the resource requests prove to be unavailable locally. A service instance (142A-142N) may further include functionality to request and consume any combination of the edge resources by way of service calls to the edge controller (144). Moreover, one of ordinary skill will appreciate that a service instance (142A-142N) may perform other functionalities without departing from the scope of the invention.

In one embodiment of the invention, the edge controller (144) (also referred to as the edge operating system) may refer to a computer program that may execute on the underlying hardware of the edge node (104). The edge controller (144) may be responsible for overseeing edge node (104) operations. To that extent, the edge controller (144) may include functionality to: support fundamental edge node (104) functions; schedule tasks; mediate interactivity between logical (e.g., software) and physical (e.g., hardware) edge node (104) components; allocate or provision edge resources; and execute or invoke other computer programs (or processes) executing on the edge node (104) (e.g., utilities, background processes, etc.). One of ordinary skill will appreciate that the edge controller (144) may perform other functionalities without departing from the scope of the invention.

In one embodiment of the invention, an edge compute resource (146) may refer to a measurable quantity of a compute-relevant resource type that can be requested, allocated, and consumed. In turn, a compute-relevant resource type may pertain to a physical device (i.e., hardware), a logical intelligence (i.e., firmware, software, or virtualization), or a combination thereof, which may provide computing availability and/or functionality on the edge node (104). Examples of an edge compute resource (146) may include, but are not limited to, a central processing unit (CPU), a graphics processing unit (GPU), a microcontroller, a virtual CPU, a single-board computer, a field-programmable gate array (FPGA), an artificial intelligence (AI) process, a virtual cluster, etc.

In one embodiment of the invention, an edge memory resource (148) may refer to a measurable quantity of a memory-relevant resource type that can be requested, allocated, and consumed. In turn, a memory-relevant resource type may pertain to a physical device (i.e., hardware), a logical intelligence (i.e., firmware, software, or virtualization), or a combination thereof, which may provide memory availability and/or functionality on the edge node (104). Examples of an edge memory resource (148) may include, but are not limited to, volatile physical memory (e.g., static random access memory (SRAM), dynamic random access memory (DRAM), etc.), non-volatile physical memory (e.g., read-only memory (ROM), flash memory, etc.), and virtual memory pools formed from any combination thereof.

In one embodiment of the invention, an edge storage resource (150) may refer to a measurable quantity of a storage-relevant resource type that can be requested, allocated, and consumed. In turn, a storage-relevant resource type may pertain to a physical device (i.e., hardware), a logical intelligence (i.e., firmware, software, or virtualization), or a combination thereof, which may provide data storage availability and/or functionality on edge node (104). Examples of an edge storage resource (150) may include, but are not limited to, a hard disk drive (HDD), a solid state drive (SSD), and virtual storage pools formed from any combination thereof.

In one embodiment of the invention, an edge network resource (152) may refer to a measurable quantity of a network-relevant resource type that can be requested, allocated, and consumed. In turn, a network-relevant resource type may pertain to a physical device (i.e., hardware), a logical intelligence (i.e., firmware, software, or virtualization), or a combination thereof, which may provide networking availability and/or functionality on the edge node (104). Examples of an edge network resource (152) may include, but are not limited to, a network interface card (NIC), a network adapter, a cellular network antenna, any other communications and/or data exchange-enabling device, or a virtual equivalent of any combination thereof.

In one embodiment of the invention, the predictive protocol agent (154) may refer to a computer program or process that may execute on the underlying hardware of the edge node (104). The predictive protocol agent (154) may represent logic responsible for processing prospective information (described below) pertinent to preemptive resource caching. Processing of prospective information may lead to the derivation of resource delivery deadlines and destinations, which may be communicated via preemptive caching requests to the origin node for the proactive deployment of particular resources near those resource delivery destinations and by those resource delivery deadlines. One of ordinary skill will appreciate that the predictive protocol agent (154) may perform other functionalities without departing from the scope of the invention.

In one embodiment of the invention, prospective information may refer to one or more data sources that disclose metadata describing a prospective (i.e., transpiring at a future date and/or time) event or activity pertinent to a user. The disclosed metadata may at least include, but is not limited to, a future timestamp from which the event/activity is expected to transpire, and a geo-location at or near which the event/activity is expected to take place. Resource delivery deadlines and resource deliver destinations may be derived from the former and the latter, respectively. Examples of the aforementioned data sources may include, but are not limited to, travel itineraries, map route plans, calendar appointments, and social/recreational event interests (which may be noted by the user as pursuits of interest on their social media).

While FIG. 1C shows a configuration of subcomponents, other edge node (104) configurations may be used without departing from the scope of the invention.

Figure 1D:
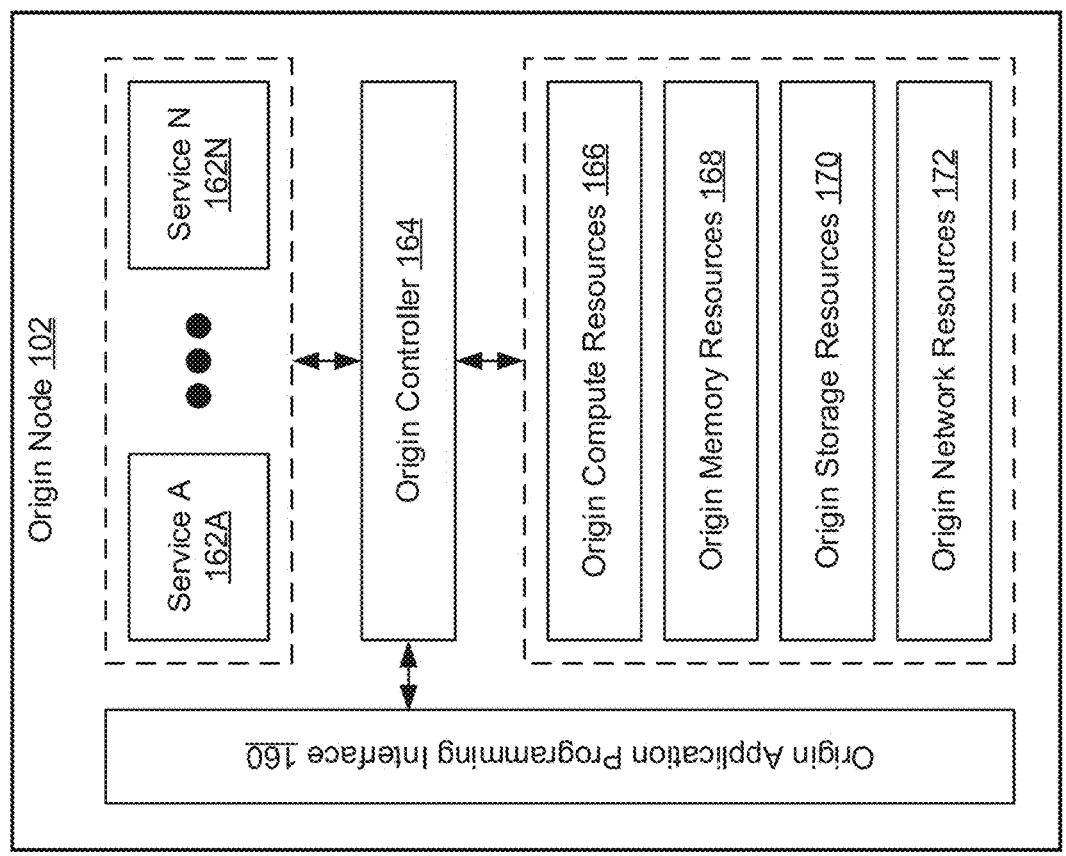
FIG. 1D shows an origin node in accordance with one or more embodiments of the invention.

FIG. 1D shows an origin node in accordance with one or more embodiments of the invention. The origin node (102) may include an origin application programming interface (API) (160), one or more services (162A-162N), an origin controller (164), and a variety of origin resources in the form of: origin compute resources (166), origin memory resources (168), origin storage resources (170), and origin network resources (172). Each of these origin node (102) subcomponents is described below.

In one embodiment of the invention, the origin API (160) may refer to a logical interface or interactivity protocol, which may facilitate communications between the origin node (102) and one or more external entities (e.g., a service client executing on the portable end device (see e.g., FIG. 1B), a service instance hosted on an edge node (see e.g., FIG. 1C), etc.). To that extent, the origin API (160) may include functionality to: receive resource requests issued from one or more service clients and delegated from one or more service instances; delegate received resource requests to one or more services (162A-162N) for processing; return obtained content (stored locally) and service functionality results (from service functionalities available locally) to the service client(s) and/or service instance(s); receive preemptive caching requests from one or more predictive protocol agents executing on edge nodes, respectively; and delegate received preemptive caching requests to the appropriate service(s) (162A-162N) for processing. One of ordinary skill will appreciate the origin API (160) may perform other functionalities without departing from the scope of the invention.

In one embodiment of the invention, a service (162A-162N) may refer to a computer program or process that may execute on the underlying hardware of the origin node (102). A service (162A-162N) may represent a complete (i.e., full version) backend intelligence for a frontend computer program (e.g., a service client on the portable end device), whereas a service instance may represent an incomplete (i.e., limited version) backend intelligence. Furthermore, a service (162A-162N) may include functionality to process resource requests from a corresponding service client on the portable end device (see e.g., FIG. 1B) or from a corresponding service instance on an edge node (see e.g., FIG. 1C) by: returning content, sought in the resource requests and to the requesting service client or service instance; invoking a service functionality using one or more parameters enclosed in the resource requests to obtain a service functionality result, should the resource requests be directed to a data processing operation versus a data retrieval operation; and return, through the origin API (160), obtained content or service functionality results to requesting service clients or service instances. A service (162A-162N) may also process preemptive caching requests from predictive protocol agents on edge nodes (see e.g., FIG. 1C) by performing the various steps outlined in the flowcharts of FIGS. 3A and 3B. A service (162A-162N) may further include functionality to request and consume any combination of the origin resources by way of service calls to the origin controller (164). Moreover, one of ordinary skill will appreciate that a service (162A-162N) may perform other functionalities without departing from the scope of the invention.

In one embodiment of the invention, the origin controller (164) (also referred to as the origin operating system) may refer to a computer program that may execute on the underlying hardware of the origin node (102). The origin controller (164) may be responsible for overseeing origin node (102) operations. To that extent, the origin controller (164) may include functionality to: support fundamental origin node (102) functions; schedule tasks; mediate interactivity between logical (e.g., software) and physical (e.g., hardware) origin node (102) components; allocate or provision edge resources; and execute or invoke other computer programs (or processes) executing on the origin node (102) (e.g., utilities, background processes, etc.). One of ordinary skill will appreciate that the origin controller (164) may perform other functionalities without departing from the scope of the invention.

In one embodiment of the invention, an origin compute resource (166) may refer to a measurable quantity of a compute-relevant resource type that can be requested, allocated, and consumed. In turn, a compute-relevant resource type may pertain to a physical device (i.e., hardware), a logical intelligence (i.e., firmware, software, or virtualization), or a combination thereof, which may provide computing availability and/or functionality on the origin node (102). Examples of an origin compute resource (166) may include, but are not limited to, a central processing unit (CPU), a graphics processing unit (GPU), a microcontroller, a virtual CPU, a single-board computer, a field-programmable gate array (FPGA), an artificial intelligence (AI) process, a virtual cluster, etc.

In one embodiment of the invention, an origin memory resource (168) may refer to a measurable quantity of a memory-relevant resource type that can be requested, allocated, and consumed. In turn, a memory-relevant resource type may pertain to a physical device (i.e., hardware), a logical intelligence (i.e., firmware, software, or virtualization), or a combination thereof, which may provide memory availability and/or functionality on the origin node (102). Examples of an origin memory resource (168) may include, but are not limited to, volatile physical memory (e.g., static random access memory (SRAM), dynamic random access memory (DRAM), etc.), non-volatile physical memory (e.g., read-only memory (ROM), flash memory, etc.), and virtual memory pools formed from any combination thereof.

In one embodiment of the invention, an origin storage resource (170) may refer to a measurable quantity of a storage-relevant resource type that can be requested, allocated, and consumed. In turn, a storage-relevant resource type may pertain to a physical device (i.e., hardware), a logical intelligence (i.e., firmware, software, or virtualization), or a combination thereof, which may provide data storage availability and/or functionality on the origin node (102). Examples of an origin storage resource (170) may include, but are not limited to, a hard disk drive (HDD), a solid state drive (SSD), and virtual storage pools formed from any combination thereof.

In one embodiment of the invention, an origin network resource (172) may refer to a measurable quantity of a network-relevant resource type that can be requested, allocated, and consumed. In turn, a network-relevant resource type may pertain to a physical device (i.e., hardware), a logical intelligence (i.e., firmware, software, or virtualization), or a combination thereof, which may provide networking availability and/or functionality on the origin node (102). Examples of an origin network resource (172) may include, but are not limited to, a network interface card (NIC), a network adapter, a cellular network antenna, any other communications and/or data exchange-enabling device, or a virtual equivalent of any combination thereof.

While FIG. 1D shows a configuration of subcomponents, other origin node (102) configurations may be used without departing from the scope of the invention.

Figure 2A:
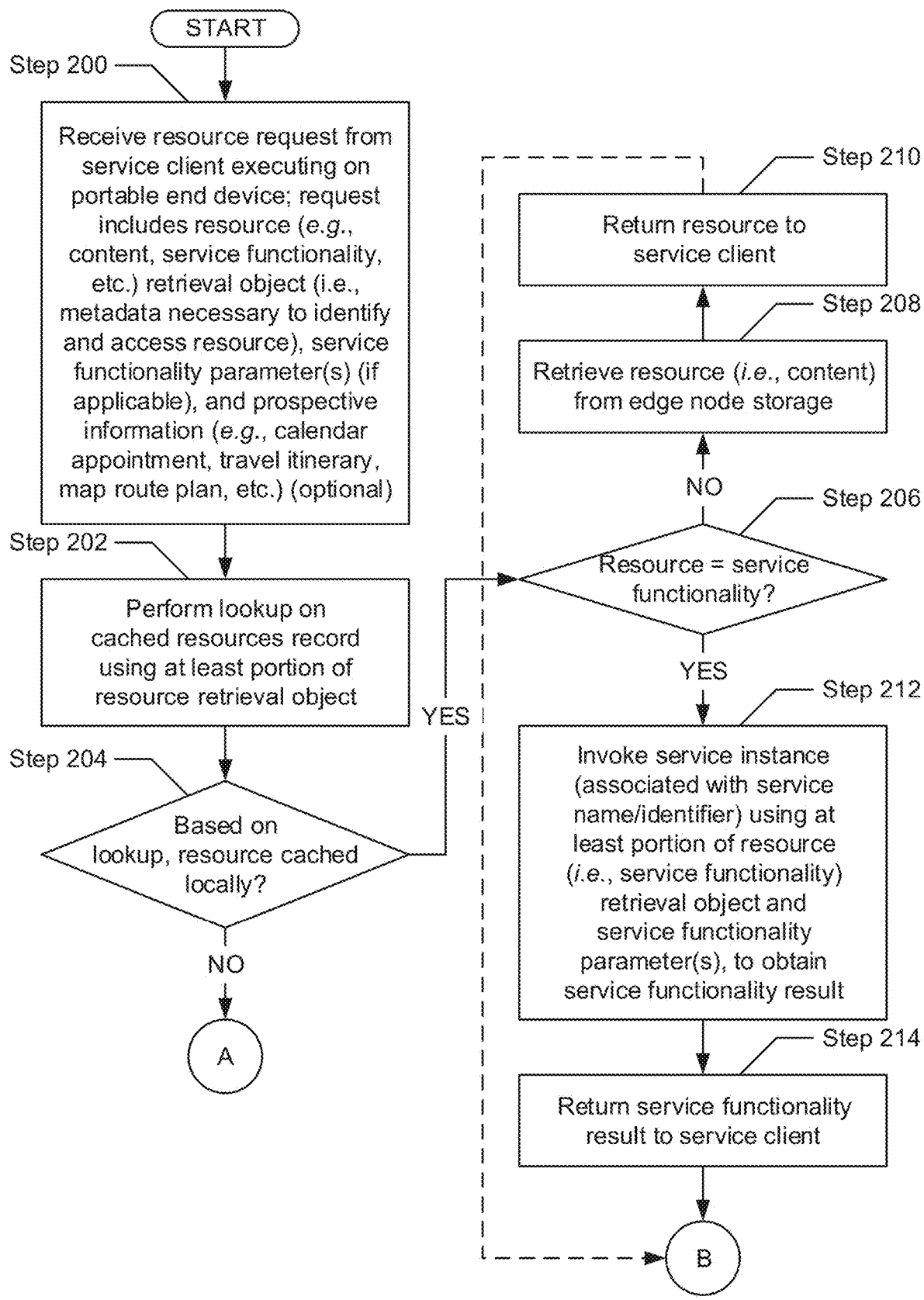
FIGS. 2A-2C show flowcharts describing a method for processing resource requests in accordance with one or more embodiments of the invention.
Figure 2B:
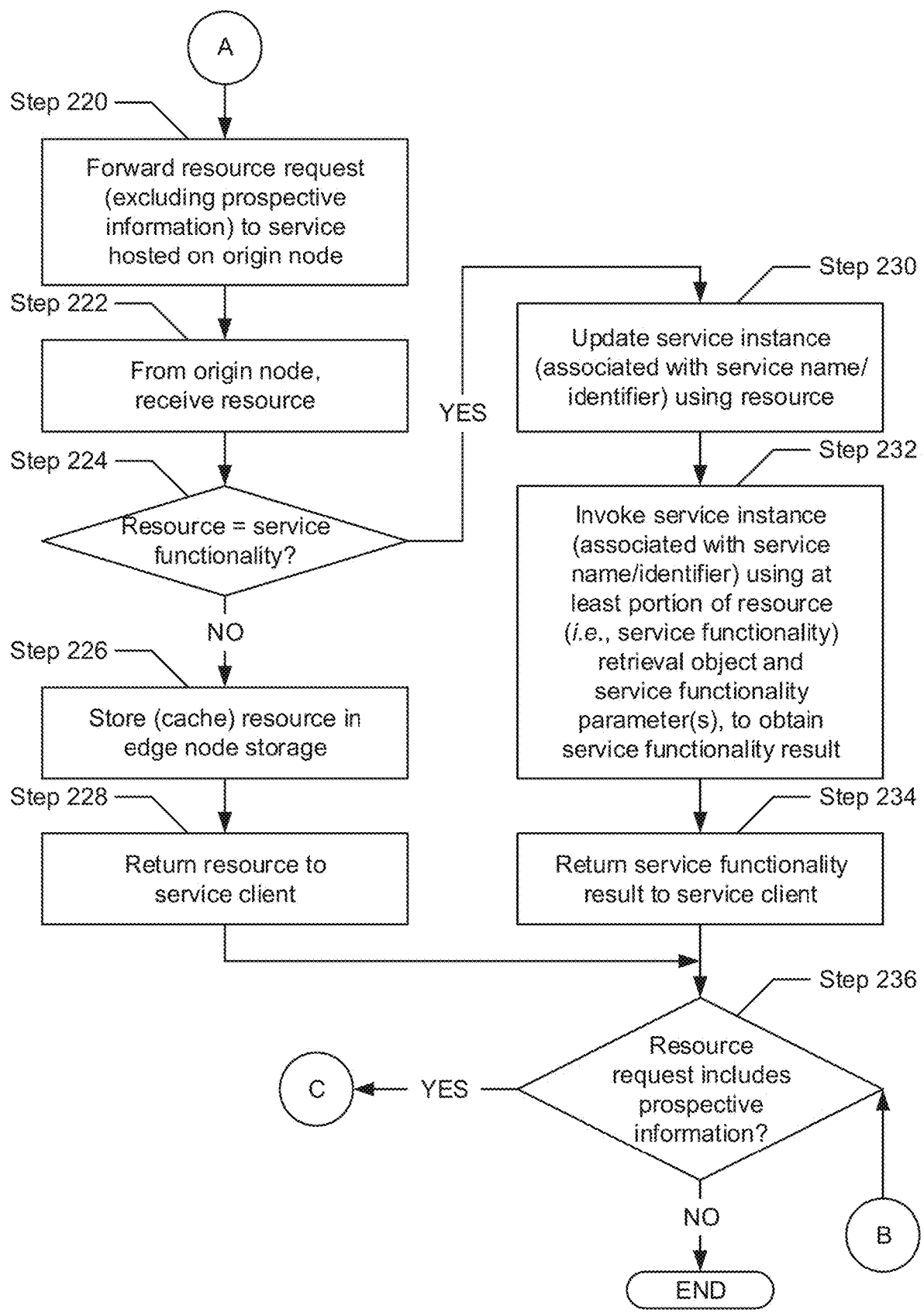
Figure 2C:
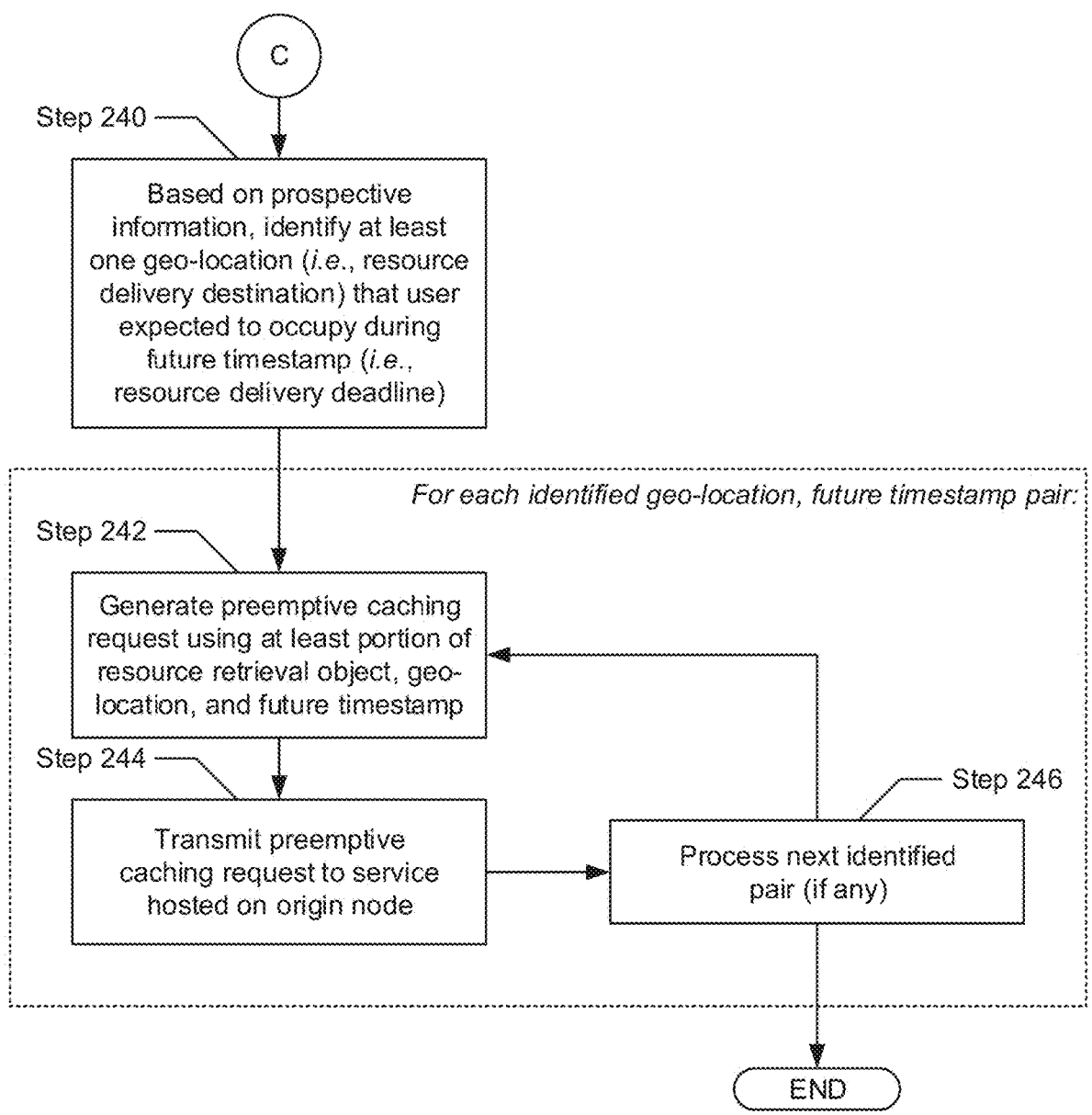

FIGS. 2A-2C show flowcharts describing a method for processing resource requests in accordance with one or more embodiments of the invention. The various steps outlined below may be performed by an edge node (see e.g., FIGS. 1A and 1C). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, a resource request is received from a service client executing on a portable end device (see e.g., FIG. 1B). In one embodiment of the invention, the resource request may include a resource retrieval object directed to a particular (sought) resource. In another embodiment of the invention, the resource request may further include one or more service functionality parameters should the particular resource, with which the resource retrieval object may be associated, be directed to a service functionality. In either of these aforementioned embodiments, the resource request may or may not additional include prospective information (described below).

In one embodiment of the invention, the above-mentioned resource retrieval object may represent a data structure or a composite data variable that specifies resource metadata useful for identifying and/or accessing a particular resource (e.g., user-specific content, socially-trending content, a service functionality, a user ecosystem, etc.). By way of examples, the aforementioned resource metadata that may be included in the resource retrieval object may include, but is not limited to, a service identifier associated with a service hosted on the origin node, a resource identifier belonging to the particular resource, a user identifier assigned to a user should the particular resource be user-specific, user access credentials for authenticating access to a user-specific resource, a version number should the particular resource be directed to a service functionality, etc.

Furthermore, in one embodiment of the invention, each of the above-mentioned service functionality parameter(s) may represent an argument (or input data) needed to invoke or execute the sought service functionality (i.e., resource), and thereby, obtain a service functionality result. The service functionality parameter(s) may vary based on the design and purpose of the sought service functionality and the nature of the service implementing the sought service functionality. On the other hand, prospective information may refer to one or more data sources that disclose metadata describing a prospective (i.e., transpiring at a future date and/or time) event or activity pertinent to a user. The disclosed metadata may at least include, but is not limited to, a future timestamp from which the event/activity is expected to transpire, and a geo-location at or near which the event/activity is expected to take place. Resource delivery deadlines and resource deliver destinations may be derived from the former and the latter, respectively. Examples of the aforementioned data sources may include, but are not limited to, travel itineraries, map route plans, calendar appointments, and social/recreational event interests (which may be noted by the user as pursuits of interest on their social media).

In Step 202, a lookup is performed on a cached resource record using at least a portion of the resource retrieval object (received in Step 200). In one embodiment of the invention, the cached resource record may refer to a data structure (e.g., table) or data container (e.g., file) maintained on the edge node. Further, the cached resource record may track which resources (if any) may be currently or already cached on the edge node.

In Step 204, based on the lookup (performed in Step 202), a determination is made as to whether the particular resource, with which the resource retrieval object (received in Step 200) is associated, is already cached (or available) on the edge node. The determination may entail identifying that the cached resource record does or does not mention the particular resource (by resource identifier, for example) therein. Accordingly, in one embodiment of the invention, if it is determined that the particular resource is already cached on the edge node, then the process proceeds to Step 206. On the other hand, in another embodiment of the invention, if it is alternatively determined that the particular resource is not currently cached on the edge node, then the process alternatively proceeds to Step 220 (see e.g., FIG. 2B).

In Step 206, upon determining (in Step 204) that the particular (sought) resource is presently cached (or available) locally on the edge node, a determination is made as to whether the particular resource is directed to a service functionality. The determination may entail examining the resource metadata included in the resource retrieval object (received in Step 200). Accordingly, in one embodiment of the invention, if it is determined that the particular resource represents a service functionality, then the process proceeds to Step 212. On the other hand, in another embodiment of the invention, if it is alternatively determined that the particular resource represents data (e.g., user-specific content, other content, user ecosystem, etc.), then the process alternatively proceeds to Step 208.

In Step 208, upon determining (in Step 206) that the particular resource is directed to data (e.g., content), the particular resource is retrieved from edge node storage. In one embodiment of the invention, the particular resource may be user-specific and, accordingly, may require access authentication using user credentials, which may be included in the resource retrieval object (if applicable). Thereafter, in Step 210, the particular resource (retrieved in Step 208) is returned, via a response to the resource request (received in Step 200), to the service client; and the process subsequently proceeds to Step 236 (see e.g., FIG. 2B).

In Step 212, upon alternatively determining (in Step 206) that the particular resource is directed to a service functionality, a service instance, executing on the edge node, is invoked to carry out the service functionality. In one embodiment of the invention, the service instance may represent a limited version of a service (or backend tied to the service client) that offers the service functionality. Further, identification of the appropriate service instance to invoke may entail examining at least a portion of the resource retrieval object (received in Step 200) (i.e., a service identifier included therein). Moreover, invocation of the service instance may also entail passing the service functionality parameter(s) (received in Step 200). In carrying out the service functionality, a service functionality result may be obtained. Thereafter, in Step 214, the service functionality result (obtained in Step 212) is returned, via a response to the resource request (received in Step 200), to the service client; and the process subsequently proceeds to Step 236 (see e.g., FIG. 2B).

Turning to FIG. 2B, in Step 220, upon alternatively determining (in Step 204) that the particular (sought) resource is not presently cached (or unavailable) locally on the edge node, the resource request (received in Step 200) is forwarded. That is, in one embodiment of the invention, the resource request may be delegated to the service—i.e., tied to the service client—hosted on the origin node (see e.g., FIG. 1D). Further, should prospective information have been received within the resource request, the resource request may be modified to exclude the prospective information prior to its forwarding to the origin node.

In Step 222, in response to the resource request (forwarded in Step 220), the particular (sought) resource is received back from the service hosted on the origin node. In Step 224, a determination is made as to whether the particular resource is directed to a service functionality. The determination may entail examining the resource metadata included in the resource retrieval object (received in Step 200). Accordingly, in one embodiment of the invention, if it is determined that the particular resource represents a service functionality, then the process proceeds to Step 230. On the other hand, in another embodiment of the invention, if it is alternatively determined that the particular resource represents data (e.g., user-specific content, other content, user ecosystem, etc.), then the process alternatively proceeds to Step 226.

In Step 226, upon determining (in Step 224) that the particular resource is directed to data (e.g., content), the particular resource (received in Step 222) is stored or cached in edge node storage. Thereafter, in Step 228, the particular resource is returned, via a response to the resource request (received in Step 200), to the service client; and the process subsequently proceeds to Step 236.

In Step 230, upon alternatively determining (in Step 204) that the particular resource is directed to a service functionality, a service instance, executing on the edge node, is updated to include the ability to perform the service functionality. In one embodiment of the invention, the service instance may represent a limited version of a service (or backend tied to the service client) that offers the service functionality. Further, identification of the appropriate service instance to update may entail examining at least a portion of the resource retrieval object (received in Step 200) (i.e., a service identifier included therein).

In Step 232, the service instance (updated in Step 230) is subsequently invoked to carry out the service functionality (received in Step 222). In one embodiment of the invention, invocation of the service instance may entail passing the service functionality parameter(s) (received in Step 200). In carrying out the service functionality, a service functionality result may be obtained. Thereafter, in Step 234, the service functionality result (obtained in Step 232) is returned, via a response to the resource request (received in Step 200), to the service client; and the process subsequently proceeds to Step 236.

In Step 236, a determination is made as to whether the resource request (received in Step 200) included prospective information. In one embodiment of the invention, if it is determined that the resource request includes prospective information, then the process proceeds to Step 240 (see e.g., FIG. 2C). On the other hand, in another embodiment of the invention, if it is alternatively determined that the resource request lacks prospective information, then the process alternatively ends.

Turning to FIG. 2C, in Step 240, upon determining (in Step 236) that the resource request (received in Step 200) includes prospective information, one or more geo-location to future timestamp pairs is/are identified. In one embodiment of the invention, a geo-location may represent a real-world geographic location (e.g., global positioning system (GPS) latitude and longitude coordinates), whereas a future timestamp may refer to data encoding a future point-in-time (e.g., date and/or time). Further, the geo-location may also be referred hereinafter as a resource delivery destination, while the future timestamp may also be referred hereinafter as a resource delivery deadline. Specifically, the resource delivery deadline may specify a latest future point-in-time by which the particular resource should be preemptively cached within the resource delivery destination. The resource delivery destination, on the other hand, may reference a position at which a requestor and/or consumer of the particular resource is anticipated or expected to occupy during the resource delivery deadline. In view of these parameters, preemptive caching may refer to deployment of a resource closer to a resource requestor/consumer (i.e., a portable end device operated by a user) to an edge node of the content delivery network in anticipation or expectation that the resource requestor/consumer will be within the geographic coverage of the edge node by or immediately following a future point-in-time.

In one embodiment of the invention, identification of the above-mentioned one or more geo-location to future timestamp pairs may be based on inspection of the prospective information. For example, if the prospective information reflects a travel itinerary or a map route plan, a geo-location to future timestamp pair may be derived therefrom for each waypoint and estimated time-of-arrival indicated in the travel itinerary or map route plan. By way of another example, if the prospective information reflects a calendar appointment, a geo-location to future timestamp pair may be derived therefrom based on the indicated appointment time and appointment location. By way of yet another example, if the prospective information reflects an event interest, a geo-location to future timestamp pair may be derived therefrom based on the indicated location and time at which the event may be scheduled to transpire.

Hereinafter, the remaining steps outlined below may be performed iteratively for each geo-location to future timestamp pair (identified in Step 240). That said, in Step 242, one or more preemptive caching requests is/are generated. In one embodiment of the invention, each preemptive caching request may include at least a portion of the resource retrieval object (received in Step 200), a given geo-location representing a resource delivery destination, and a corresponding given future timestamp representing a resource delivery deadline. Furthermore, each preemptive caching request may pertain to preemptively caching the particular resource (e.g., content, service functionality, etc.) in entirety or a subcomponent of the particular resource (e.g., an individual media track of a playlist of media tracks, a precise function of a group of functions forming a particular service functionality, etc.).

In Step 244, the preemptive caching request(s) (generated in Step 242) is/are transmitted to the service—i.e., tied to the service client—hosted on the origin node (see e.g., FIG. 1D) for processing. Subsequently, in Step 246, a next geo-location to future timestamp pair (if any more had been identified in Step 240) is processed, whereby the process proceeds to Step 242. Alternatively, if there are no further geo-location to future timestamp pairs to process, the process ends.

Figure 3A:
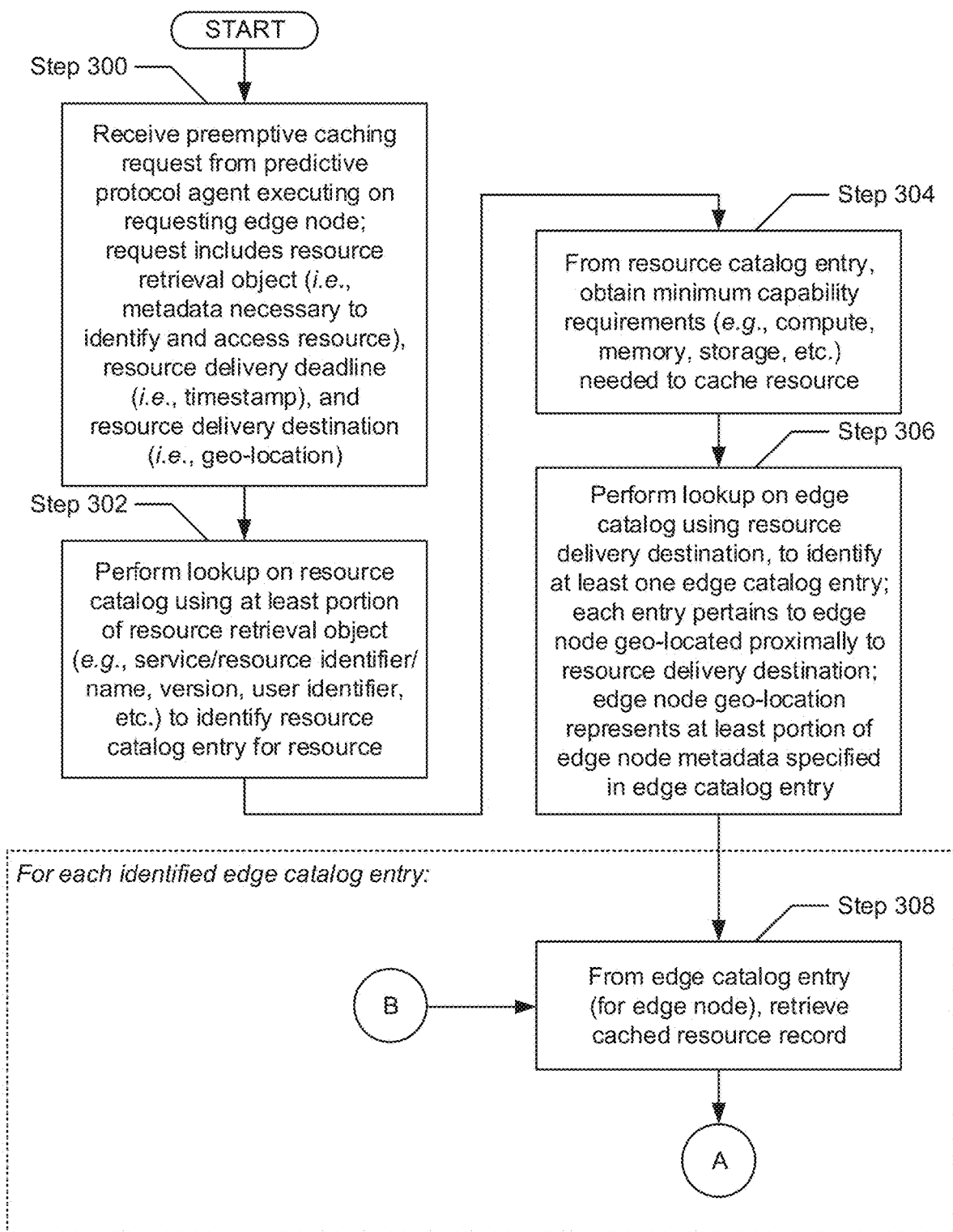
FIGS. 3A and 3B show flowcharts describing a method for processing preemptive caching requests in accordance with one or more embodiments of the invention.
Figure 3B:
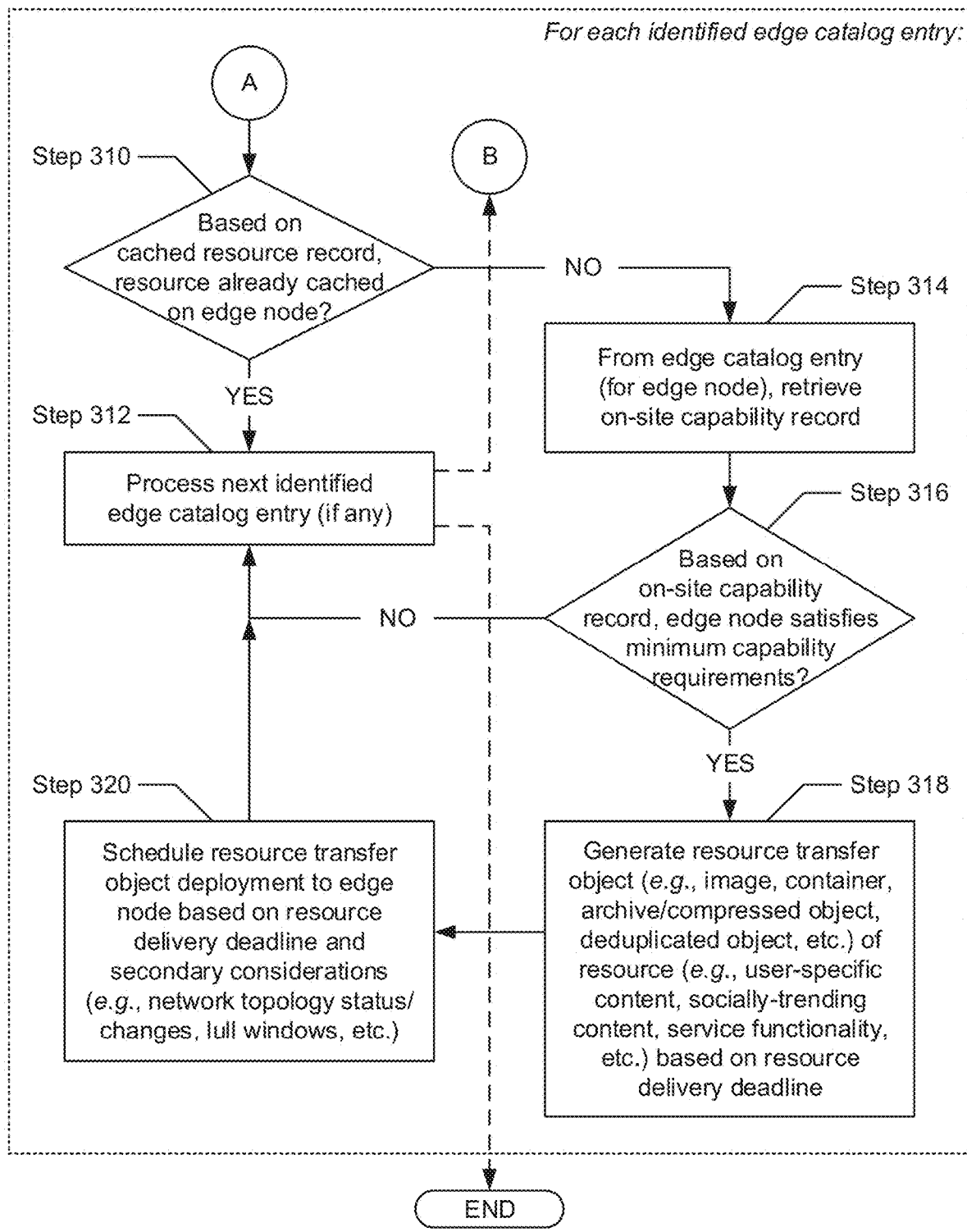

FIGS. 3A and 3B show flowcharts describing a method for processing preemptive caching requests in accordance with one or more embodiments of the invention. The various steps outlined below may be performed by an origin node (see e.g., FIGS. 1A and 1D). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, a preemptive caching request is received from a predictive protocol agent executing on an edge node (see e.g., FIG. 1C). In one embodiment of the invention, the preemptive caching request may include a resource retrieval object, a resource delivery deadline, and a resource delivery destination. The resource retrieval object may represent a data structure or a composite data variable that specifies resource metadata useful for identifying and/or accessing a particular resource (e.g., user-specific content, socially-trending content, a service functionality, a user ecosystem, etc.). By way of examples, the aforementioned resource metadata that may be included in the resource retrieval object may include, but is not limited to, a service identifier associated with a service hosted on the origin node, a resource identifier belonging to the particular resource, a user identifier assigned to a user should the particular resource be user-specific, user access credentials for authenticating access to a user-specific resource, a version number should the particular resource be directed to a service functionality, etc.

Furthermore, the above-mentioned resource delivery deadline may represent a timestamp encoding a future point-in-time (i.e., date and/or time). Specifically, the resource delivery deadline may specify a latest future point-in-time by which the particular resource should be preemptively cached within the resource delivery destination. On the other hand, the resource delivery destination may represent a geo-location (e.g., global positioning system (GPS) latitude and longitude coordinates) at which a requestor and/or consumer of the particular resource is anticipated or expected to be positioned during the resource delivery deadline. In view of these parameters, preemptive caching may refer to deployment of a resource closer to a resource requestor/consumer (i.e., a portable end device operated by a user) to an edge node of the content delivery network in anticipation or expectation that the resource requestor/consumer will be within the geographic coverage of the edge node by or immediately following a future point-in-time.

In Step 302, a lookup is performed on a resource catalog using at least a portion of the resource retrieval object (received in Step 300). In one embodiment of the invention, the lookup may result in the identification of a resource catalog entry pertaining to the particular resource to which the resource retrieval object is directed. Furthermore, the resource catalog may refer to a data structure (e.g., table) maintained on the origin node, which may track the various resources consolidated or available on the origin node. Specifically, metadata descriptive of each resource may be tracked through a respective resource catalog entry of the resource catalog. The aforementioned metadata, for a particular resource, may include, but is not limited to, a service identifier associated with a service offering the particular resource, a resource identifier belonging to the particular resource, a user identifier assigned to a user (if applicable to the particular resource), minimum capability requirements (e.g., edge node resources (described above) (see e.g., FIG. 1C)) necessary to cache the particular resource on any given edge node, and a storage address referencing physical origin node storage wherein the particular resource (e.g., data for content, code for service functionality, etc.) may be consolidated.

In Step 304, from the resource catalog entry (identified in Step 302), the above-mentioned minimum capability requirements are obtained. More specifically, in one embodiment of the invention, the minimum capability requirements may, for example, specify: a minimum processing and/or memory capability needed to invoke the particular resource (i.e., should the particular resource refer to a service functionality); and/or a minimum storage availability needed to cache (or store) the particular resource (i.e., content data or service functionality program code) on the edge node.

In Step 306, a lookup is performed on an edge catalog using the resource delivery destination (received in Step 300). In one embodiment of the invention, the lookup may result in the identification of one or more edge catalog entries pertaining to one or more edge nodes, respectively. Furthermore, the edge catalog entry(ies) may be identified based on edge node metadata therein meeting criteria with respect to the resource delivery destination. For example, at least a portion of the edge node metadata specified in each edge catalog entry may include a geo-location at which the edge node physically resides. Accordingly, the identified edge catalog entry(ies) may pertain to one or more edge nodes that physical reside within a prescribed proximity threshold (e.g., a mile) from the resource delivery destination.

In one embodiment of the invention, the edge catalog may refer to a data structure (e.g., table) maintained on the origin node, which may track the various edge nodes at least in part implementing the content delivery network. Further, metadata descriptive of each edge node may be tracked through a respective edge catalog entry of the edge catalog. The aforementioned metadata, for a given edge node (aside from the above-mentioned edge node geo-location), may include, but is not limited to, a node identifier associated with the edge node, a cached resource record disclosing the resources currently cached on the edge node, an on-site capability record disclosing the edge resources (i.e., compute, memory, storage, etc.) available on the edge node, and node forwarding information disclosing communication-specific metadata (e.g., Internet Protocol (IP) address, media access control (MAC) address, port number, etc.) necessary to deploy a particular resource (or any data for that matter) to the edge node.

Hereinafter, the remaining steps outlined below may be performed iteratively for each edge catalog entry (identified in Step 306). That said, in Step 308, from a given edge catalog entry pertaining to a given edge node, the above-mentioned cached resource record is retrieved. In one embodiment of the invention, the cached resource record may refer to a data structure (e.g., table) or data container (e.g., file) within which resources, currently or already cached on the given edge node, may be tracked.

Turning to FIG. 3B, in Step 310, based on the cached resource record (retrieved in Step 308), a determination is made as to whether the particular resource, to which the resource retrieval object (received in Step 300) is directed, has already been cached on the given edge node. The determination may entail identifying that the cached resource record does or does not mention the particular resource (by resource identifier, for example) therein. Accordingly, in one embodiment of the invention, if it is determined that the particular resource is already cached on the given edge node, then the process proceeds to Step 312. On the other hand, in another embodiment of the invention, if it is alternatively determined that the particular resource is not currently cached on the given edge node, then the process alternatively proceeds to Step 314.

In Step 312, upon determining (in Step 310) that the particular resource is already cached on the given edge node, no further action is necessary at least with respect to preemptively caching the particular resource on the given edge node. Subsequently, in one embodiment of the invention, a next edge catalog entry (if any more had been identified in Step 306) is processed, whereby the process proceeds to Step 308. Alternatively, if there are no further edge catalog entries to process, the process ends.

In Step 314, upon alternatively determining (in Step 310) that the particular resource is not currently cached on the given edge node, the above-mentioned on-site capability record is retrieved from the given edge catalog entry pertaining to the given edge node. In one embodiment of the invention, the on-site capability record may refer to a data structure (e.g., table) or data container (e.g., file) within which edge resources (e.g., compute, memory, storage, etc.), available on the given edge node, may be tracked.

In Step 316, based on the on-site capability record (retrieved in Step 314), a determination is made as to whether the edge resources of the given edge node satisfy the minimum capability requirements (obtained in Step 304) for caching the particular resource. In one embodiment of the invention, if it is determined that the edge resources meet the minimum capability requirements, then the process proceeds to Step 318. On the other hand, in another embodiment of the invention, if it is alternatively determined that the edge resources fail to meet the minimum capability requirements, then the process alternatively proceeds to Step 312 (where a next edge catalog entry (if any left) may be processed).

In Step 318, upon determining (in Step 316) that the edge resources of the given edge node meets the minimum capability requirements for caching the particular resource, a resource transfer object is generated. In one embodiment of the invention, the resource transfer object may represent a data vessel within and through which the particular resource may be deployed to the given edge node. For example, if the particular resource is directed to content, then the resource transfer object may take the form of an archive file or an ISO image, which may facilitate the transport of the content across the content delivery network to the given edge node. By way of another example, if the particular resource is directed to a service functionality, then the resource transfer object may take the form of an archive file or a virtualization container.

Furthermore, in one embodiment of the invention, compression or deduplication may be applied to the particular resource towards generating the resource transfer object. In such an embodiment, these additional techniques may be applied to the particular resource based on whether the resource delivery deadline (received in Step 300) is distant enough into the future to permit their execution. Moreover, compression or deduplication may entail manipulating data, though by different means, to reduce the storage space (or byte size) of the data. Data reduction thus may further facilitate transport of the particular resource through the content delivery network towards the given edge node.

In Step 320, the resource transfer object (generated in Step 320) is either deployed immediately or scheduled for a later deployment window. In one embodiment of the invention, deployment of the resource transfer object may be contingent on one or more factors, including the resource delivery deadline (received in Step 300) (or more specifically, the span of time remaining until the resource delivery deadline), the geographical distance between the origin node and the given edge node, and/or other secondary considerations. These other secondary considerations may include, but are not limited to, a current configuration and/or status of the content delivery network topology, time windows reflecting traffic congestion throughout the content delivery network, and other network analytics or metrics pertinent to the content delivery network. Hereinafter, the process proceeds to Step 312.

Figure 4:
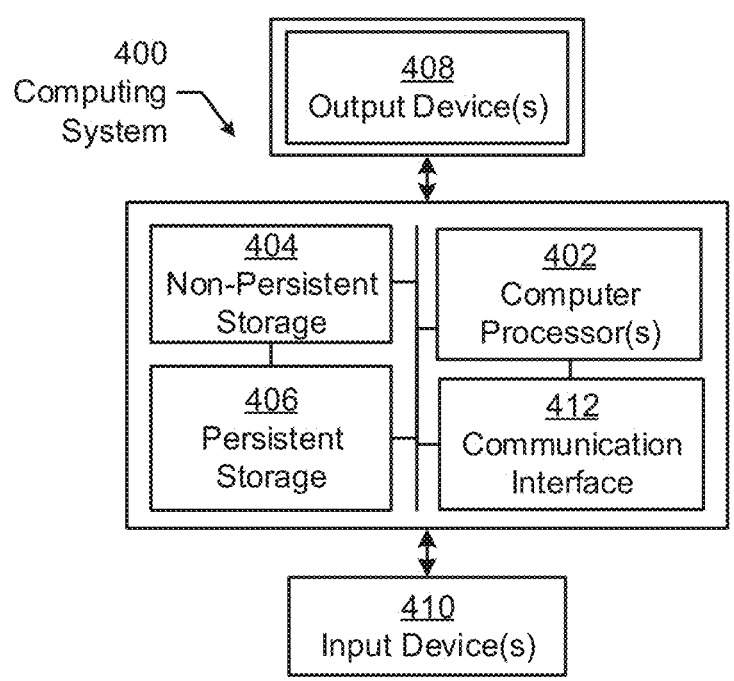
FIG. 4 shows an exemplary computer system in accordance with one or more embodiments of the invention.

FIG. 4 shows an exemplary computer system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
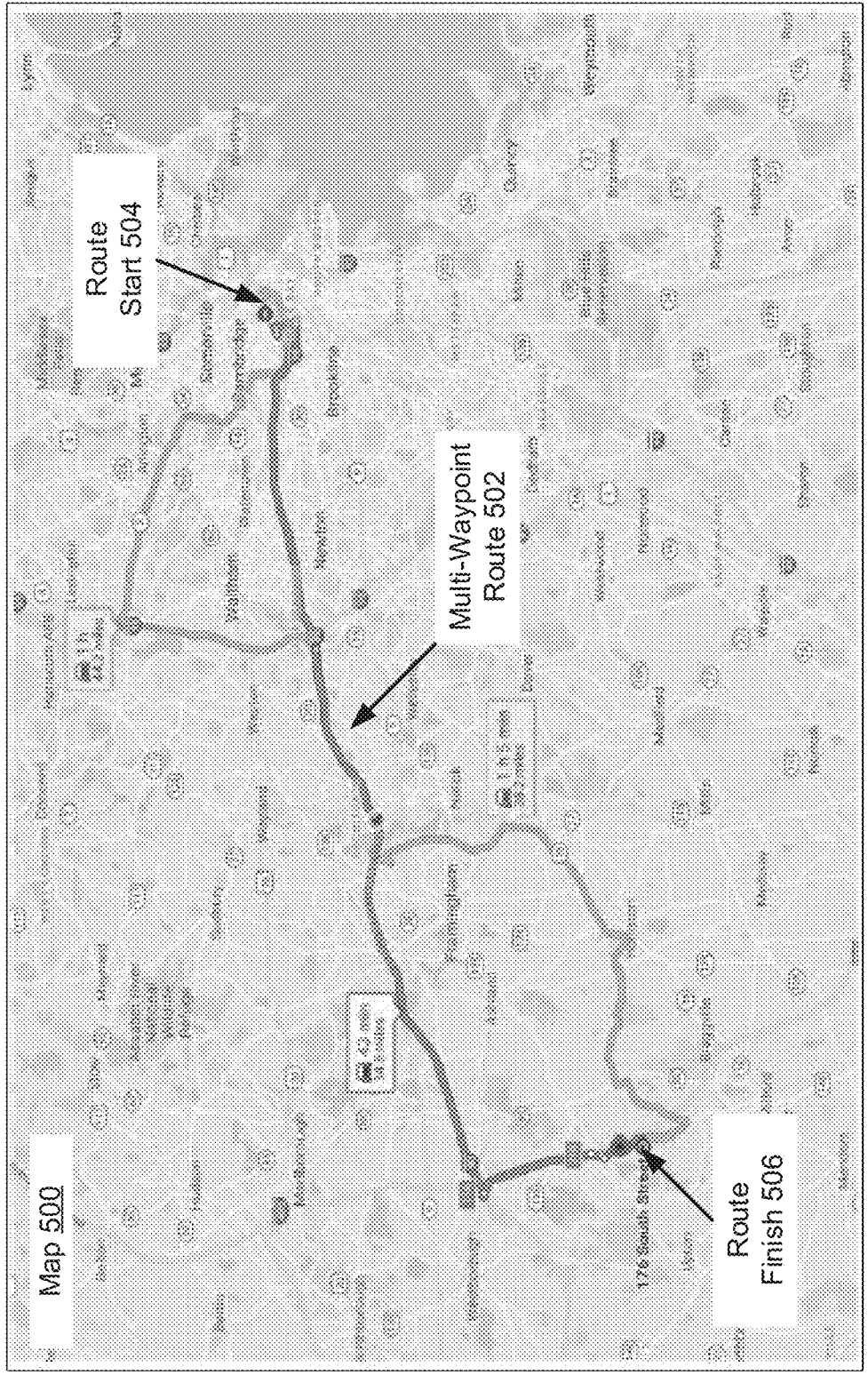
FIGS. 5A-5C show an exemplary scenario in accordance with one or more embodiments of the invention.
Figure 5B:
Figure 5C:
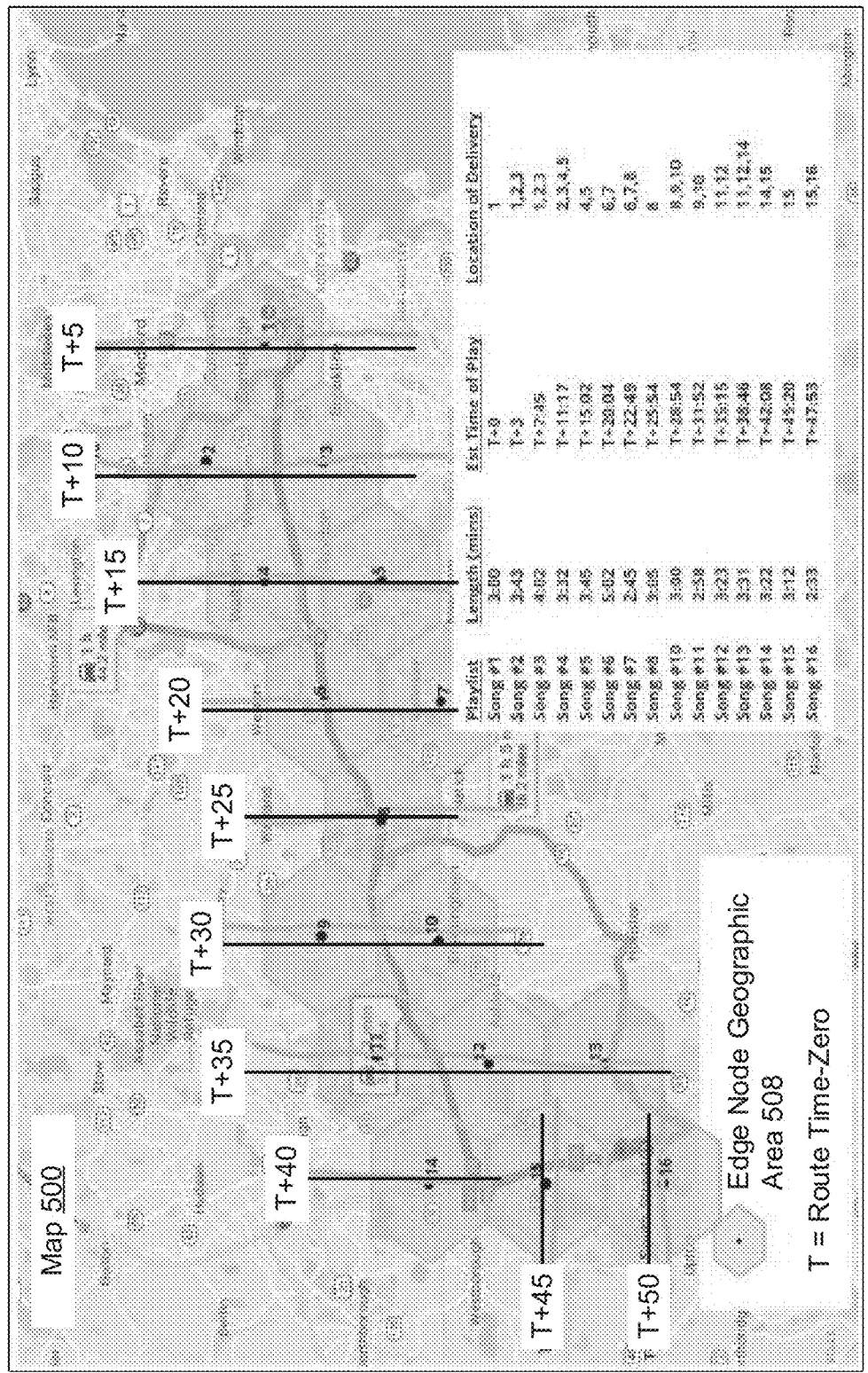

FIGS. 5A-5C show an exemplary scenario in accordance with one or more embodiments of the invention. The following exemplary scenario, presented in conjunction with components shown in the below mentioned figures, is for explanatory purposes only and not intended to limit the scope of the invention.

Turning to the exemplary scenario, consider the following context. John Doe is preparing to depart from his home on a commute, through a busy metropolitan area, to his workplace some distance away. Just prior to commencing the commute, John Doe engages a map routing application installed on his smartphone to obtain a map route plan for the commute. John Doe, thereafter, also engages a streaming media playing application installed on his smartphone in order to listen to a selected track playlist throughout the commute. With these activities performed, John Doe mounts his smartphone on his vehicle dashboard and proceeds to drive along the obtained map route plan towards his workplace. In this context, the map route plan represents prospective information pertinent to preemptive caching, the streaming media playing application represents the service client executing on the portable end device (i.e., the smartphone), and the selected track playlist represents the particular (sought) resource.

Turning to FIG. 5A, a map (500) of the above-mentioned metropolitan area is portrayed. The map (500) may resemble a result obtained from engagement of the above-mentioned map routing application. Further, the map (500) visualizes a multi-waypoint route (i.e., the above-mentioned map route plan) (502) through the metropolitan area, which stems from a route start (504) (i.e., John Doe's home) to a route finish (506) (i.e., John Doe's workplace).

Turning to FIG. 5B, immediately following engagement of the streaming media playing application (i.e., service client), a resource request for the selected track playlist (i.e., resource) is issued by the application and to the backend. An edge node (e.g., cellular tower) most proximal to the smartphone (i.e., portable end device) receives the resource request, and henceforth, delegates the resource request to a limited backend intelligence (i.e., service instance)—tied to the service client—for processing. The resource request includes resource metadata (i.e., resource retrieval object) necessary to identify and/or access the selected track playlist, and data representative of the map route plan (i.e., prospective information). Embodiments of the invention, acting on the edge node, subsequently derive multiple geo-location to future timestamp pairs (i.e., resource delivery destinations and resource delivery deadlines) from the map route plan data. The geo-locations may be extracted from GPS latitude and longitude coordinates included in the map route plan data for the various waypoints thereof, while the future timestamps may be extracted from the estimated time included in the map route plan data for reaching the various waypoints along the map route plan. Embodiments of the invention, acting on the edge node, further generate and transmit a preemptive caching request for each resource delivery deadline and destination pair, and towards the complete backend intelligence (i.e., service)—tied to the service client—for processing. Each preemptive caching request includes the resource metadata (from the received resource request), a given resource delivery deadline, and a corresponding given resource delivery destination.

Each above-mentioned preemptive caching request traverses the content delivery network to eventually arrive at a datacenter or cloud computing server (i.e., origin node). From here, the full backend intelligence (i.e., service) for the streaming media player application (i.e., service client) processes each received preemptive caching request. Briefly, for a given preemptive caching request, embodiments of the invention, acting on the origin node, proceed to process the given preemptive caching request by identifying one or more edge nodes, responsible for a geographic area (508) of the map (500), where each identified edge node lies within a proximity threshold (e.g., one mile) of the given resource delivery destination. This action is performed for each resource delivery destination indicated throughout the map route plan. For the instant exemplary scenario, sixteen such edge nodes are identified (see e.g., the enumerated dots at the center of the various hexagonal geographic coverage areas (508)).

Turning to FIG. 5C, the various above-derived resource delivery deadlines are overlaid onto the map (500) and throughout the map route plan. Each resource delivery deadline is indicated through a line vertically or horizontally traversing one or more edge node geographic areas (508). Further, each resource delivery deadline is annotated by a route (or commute) time-zero (T) plus a number of minutes (e.g., T+5, T+10, T+15, and so on). Accordingly, each resource delivery deadline reflects a future point-in-time with respect to a timestamp (i.e., route time-zero) encoding the date and/or time during which John Doe is positioned at the route start (i.e., his house).

Following the identification of the various edge nodes, embodiments of the invention, acting on the origin node, further process each received preemptive caching request by substantively deploying the selected track playlist (i.e., resource) in entirety or in segments (i.e., individual tracks) to the edge nodes in consideration of the various resource delivery deadlines. Deployment of the latter, to the various identified edge nodes, is outlined in the embedded table shown in FIG. 5C. Summarily, each individual track (or song) of the selected track playlist is deployed (i.e., preemptively cached) at one or more edge nodes based on the elapsed play time of the selected track playlist and the estimated geo-location of John Doe during the elapsed play time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for preemptively caching resources in a system that includes an origin node operatively connected to a plurality of edge nodes, wherein the origin node maintains a resource catalog configured to track resources available on the origin node, and an edge catalog containing a plurality of catalog entries pertaining the plurality of edge nodes, comprising:

receiving, by the origin node and from a first edge node of the plurality of edge nodes, a first preemptive caching request comprising a first resource retrieval object, a first resource delivery deadline, and a first resource delivery destination, wherein the first resource delivery deadline and the first resource delivery destination are derived from prospective information for a user obtained from a portable end device, wherein the prospective information comprises at least one of a map route plan, travel itineraries and calendar appointments;

performing a first lookup on the resource catalog using at least a portion of the first resource retrieval object to identify a first resource catalog entry for a first resource, wherein the first resource catalog entry specifies minimum capability requirements needed to cache the first resource;

performing a second lookup on the edge catalog on the origin node using the first resource delivery destination to identify an edge catalog entry for a second edge node;

retrieving, using the edge catalog entry, a cached resource record for the second edge node from the origin node;

making a first determination, using the cached resource record, that the first resource is not cached on the second edge node;

in response to the first determination, obtaining, using the cached resource record, an on-site capability record for the second edge node from the origin node;

making a second determination, based on the on-site capability record, that the second edge node comprises edge resources satisfying the minimum capability requirements for the first resource;

in response to the second determination, generating a resource transfer object, wherein generating the resource transfer object comprises:
  obtaining the first resource,
  making a third determination to apply additional processing to the first resource to generate a processed first resource, wherein the third determination is made based on an amount of time required to apply the additional processing and the first resource delivery deadline, wherein the additional processing is at least one of compression or deduplication, and
  generating the resource transfer object using the processed first resource; and deploying the resource transfer object, to preemptively cache, the first resource onto the second edge node prior to the first resource delivery deadline, wherein the second edge node is located within a proximity threshold of an expected geo-location during the first resource delivery deadline, wherein the expected geo-location is on the map route plan, wherein the portable end device is not located at the expected geo-location when the origin node receives the first preemptive caching request, and wherein the portable end device follows the map route plan to the expected geo-location, wherein the first resource retrieval object comprises a service identifier associated with a service providing at least the first resource, and a resource identifier associated with the first resource, wherein at least the portion of the first resource retrieval object used to identify the first resource comprises the resource identifier, wherein the user uses the portable end device to access the first resource via the second edge node at the expected geo-location.

2. The method of claim 1, wherein the first resource retrieval object further comprises a user identifier associated with the user, and user access credentials for authenticating the user.

3. The method of claim 1, wherein the first resource delivery deadline reflects a timestamp encoding a future point-in-time.

4. The method of claim 1, wherein the first resource comprises one selected from a group consisting of content and a service functionality.

5. The method of claim 1, wherein the second lookup further identifies a third edge node, wherein the first resource is further deployed onto the third edge node to preemptively cache the first resource thereon prior to the first resource delivery deadline.

6. The method of claim 1, further comprising:
receiving, from the first edge node, a second preemptive caching request comprising a second resource retrieval object, the first resource delivery deadline, and the first resource delivery destination;
performing a third lookup on the resource catalog using at least a portion of the second resource retrieval object to identify a second resource; and
deploying, to preemptively cache, the second resource onto the second edge node prior to the first resource delivery deadline.

7. The method of claim 1, further comprising:
receiving, from the first edge node, a second preemptive caching request comprising a second resource retrieval object, a second resource delivery deadline, and a second resource delivery destination;
performing a third lookup on the resource catalog using at least a portion of the second resource retrieval object to identify a second resource;
performing a fourth lookup on the edge catalog using the second resource delivery destination to identify one selected from a group consisting of the second edge node and a third edge node; and
deploying, to preemptively cache, the second resource onto one selected from the group consisting of the second edge node and the third edge node prior to the second resource delivery deadline.

8. A non-transitory computer-readable medium (CRM) comprising computer readable program code for preemptively caching resources in a system that includes an origin node operatively connected to a plurality of edge nodes, wherein the origin node maintains a resource catalog configured to track resources available on the origin node, and an edge catalog containing a plurality of catalog entries pertaining the plurality of edge nodes, which when executed by a computer processor, enables the computer processor to:
receive, by the origin node and from a first edge node of the plurality of nodes, a first preemptive caching request comprising a first resource retrieval object, a first resource delivery deadline, and a first resource delivery destination, wherein the first resource delivery deadline and the first resource delivery destination are derived from prospective information for a user obtained from a portable end device, wherein the prospective information comprises at least one of a map route plan, travel itineraries and calendar appointments;
perform a first lookup on the resource catalog using at least a portion of the first resource retrieval object to identify a first resource catalog entry for a first resource, wherein the first resource catalog entry specifies minimum capability requirements needed to cache the first resource;
perform a second lookup on the edge catalog on the origin node using the first resource delivery destination to identify an edge catalog entry for a second edge node;
retrieve, using the edge catalog entry, a cached resource record for the second edge node from the origin node;
make a first determination, using the cached resource record, that the first resource is not cached on the second edge node;
in response to the first determination, obtain, using the cached resource record, an on-site capability record for the second edge node from the origin node;
make a second determination, based on the on-site capability record, that the second edge node comprises edge resources satisfying the minimum capability requirements for the first resource;
in response to the second determination, generate a resource transfer object, wherein generating the resource transfer object comprises:
  obtaining the first resource,
  making a third determination to apply additional processing to the first resource to generate a processed first resource, wherein the third determination is made based on an amount of time required to apply the additional processing and the first resource delivery deadline, wherein the additional processing is at least one of compression or deduplication, and
  generating the resource transfer object using the processed first resource; and
deploy the resource transfer object, to preemptively cache, the first resource onto the second edge node prior to the first resource delivery deadline, wherein the second edge node is located within a proximity threshold of an expected geo-location during the first resource delivery deadline, wherein the expected geo-location is on the map route plan, wherein the portable end device is not located at the expected geo-location when the origin node receives the first preemptive caching request, and wherein the portable end device follows the map route plan to the expected geo-location, wherein the first resource retrieval object comprises a service identifier associated with a service providing at least the first resource, and a resource identifier associated with the first resource, wherein at least the portion of the first resource retrieval object used to identify the first resource comprises the resource identifier, wherein the user uses the portable end device to access the first resource via the second edge node at the expected geo-location.

9. The non-transitory CRM of claim 8, wherein the first resource retrieval object further comprises a user identifier associated with the user, and user access credentials for authenticating the user.

10. The non-transitory CRM of claim 8, wherein the first resource delivery deadline reflects a timestamp encoding a future point-in-time.

11. The non-transitory CRM of claim 8, wherein the first resource comprises one selected from a group consisting of content and a service functionality.

12. The non-transitory CRM of claim 8, wherein the second lookup further identifies a third edge node, wherein the first resource is further deployed onto the third edge node to preemptively cache the first resource thereon prior to the first resource delivery deadline.

* * * * *